US005397049A

United States Patent [19]
Gileta et al.

[11] Patent Number: 5,397,049
[45] Date of Patent: Mar. 14, 1995

[54] GAS SHROUDED SOLDER WAVE WITH REDUCED SOLDER SPLATTER

[75] Inventors: John H. Gileta, Chateauguay, Canada; Michael T. Mittag, New Haven, Vt.

[73] Assignee: Electrovert Ltd., La Prairie, Canada

[21] Appl. No.: 184,457

[22] Filed: Jan. 19, 1994

Related U.S. Application Data

[63] Continuation-in-part of Ser. No. 13,973, Feb. 4, 1993, Pat. No. 5,292,055, which is a continuation-in-part of Ser. No. 961,781, Oct. 15, 1992, Pat. No. 5,240,169, which is a continuation-in-part of Ser. No. 860,316, Mar. 30, 1992, Pat. No. 5,203,489, which is a continuation-in-part of Ser. No. 804,904, Dec. 6, 1991, abandoned.

[51] Int. Cl.$^6$ .......................... H05K 3/34; B23K 3/00
[52] U.S. Cl. ........................................ 228/37; 228/42
[58] Field of Search ............... 228/37, 42, 180.1, 219, 228/260; 118/429; 427/96, 123

[56] References Cited

U.S. PATENT DOCUMENTS

| | | | |
|---|---|---|---|
| 3,216,643 | 11/1965 | Verter | 228/37 |
| 3,704,686 | 12/1982 | Schrempp et al. | 228/37 |
| 3,705,457 | 12/1972 | Tardoskegyi | 228/219 |
| 4,412,641 | 11/1983 | Fuch et al. | 228/37 |
| 4,568,012 | 2/1986 | Kakuhata et al. | 228/37 |
| 5,044,542 | 9/1991 | Deambosio | 228/37 |
| 5,048,746 | 9/1991 | Elliott et al. | 228/37 |
| 5,176,307 | 1/1993 | Hagerty et al. | 228/37 |
| 5,203,489 | 4/1993 | Gileta et al. | 228/37 |
| 5,228,614 | 7/1993 | Elliott et al. | 228/37 |
| 5,240,169 | 8/1993 | Gileta | 228/37 |
| 5,292,055 | 3/1994 | Gileta | 228/219 |
| 5,294,036 | 3/1994 | Den Dopper | 228/37 |

FOREIGN PATENT DOCUMENTS

| | | |
|---|---|---|
| 0527522A1 | 2/1993 | European Pat. Off. . |
| 286058 | 12/1986 | Japan . |
| 9101383 | 6/1991 | Netherlands . |
| 1486281 | 6/1989 | U.S.S.R. . |

*Primary Examiner*—Samuel M. Heinrich
*Attorney, Agent, or Firm*—Darby & Darby

[57] ABSTRACT

A cover or shroud extends over a solder reservoir and has a slot for a solder wave to protrude therethrough. Gas is provided to blanket the solder wave and the shroud is positioned to reduce solder from contacting elements that are conveyed through the solder wave. The devise comprises a solder reservoir having at least one solder nozzle projected therefrom, a pump for forming a solder wave from the nozzle, a cover for covering at least a portion of the reservoir containing the solder wave, the cover having a longitudinal slot for the solder wave to pass therethrough and contain solder splatter caused by the solder wave falling into the solder reservoir. A gas supply provides gas under the cover and also provides a gas blanket over the solder wave, and a conveyor moves the element in a predetermined path over the cover ensuring at least a portion of the element passes through the solder wave.

23 Claims, 4 Drawing Sheets

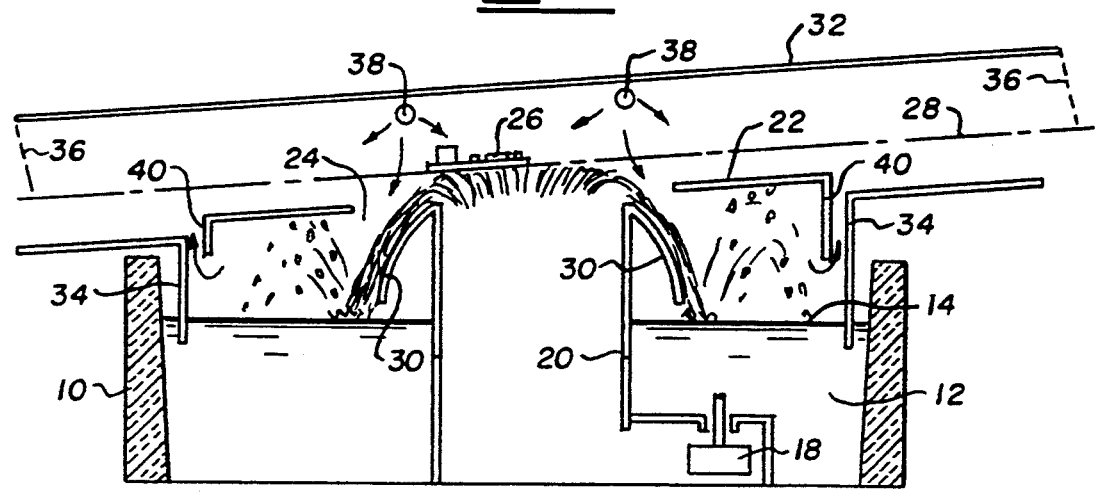
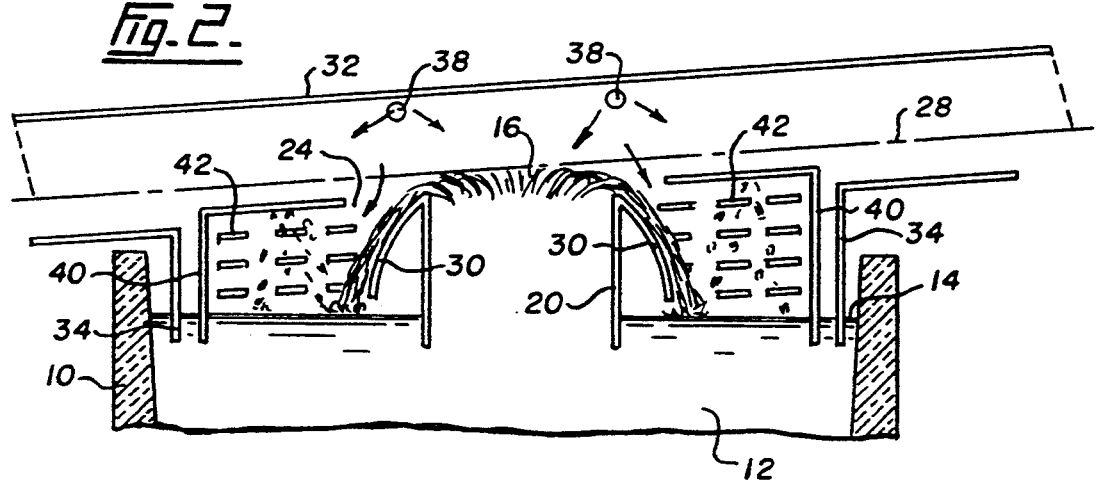
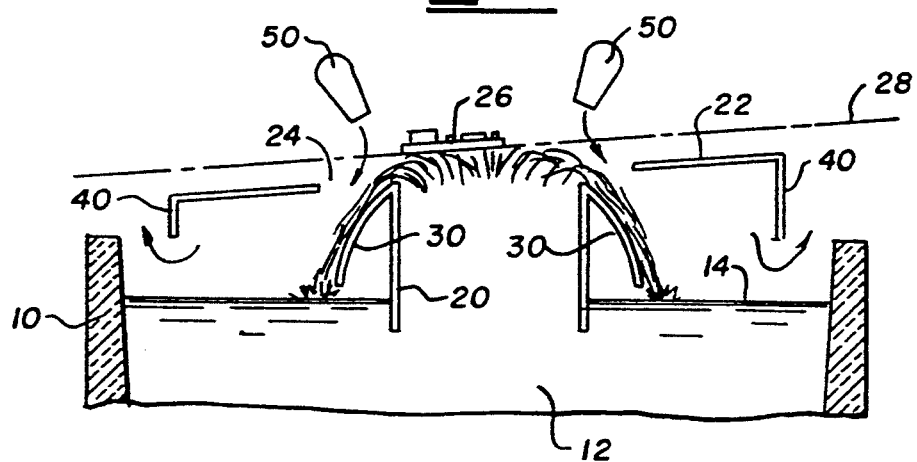

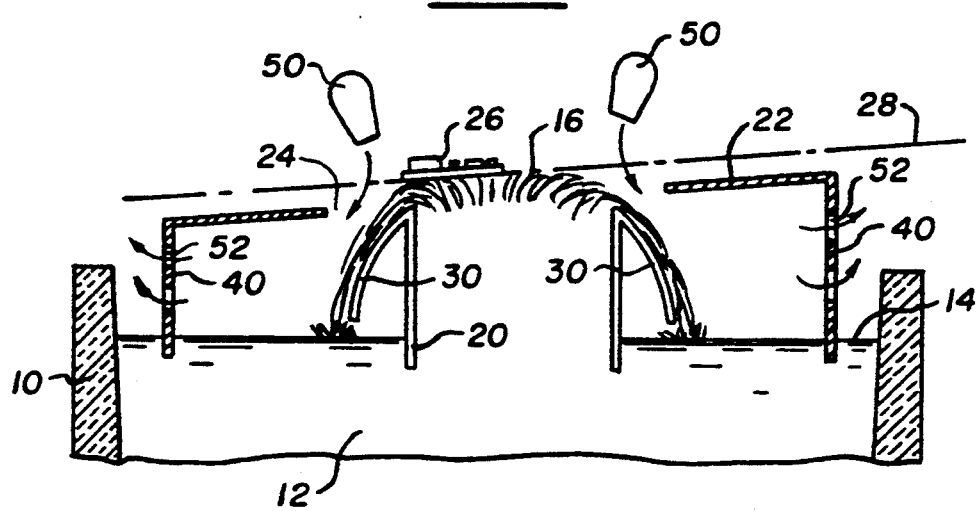
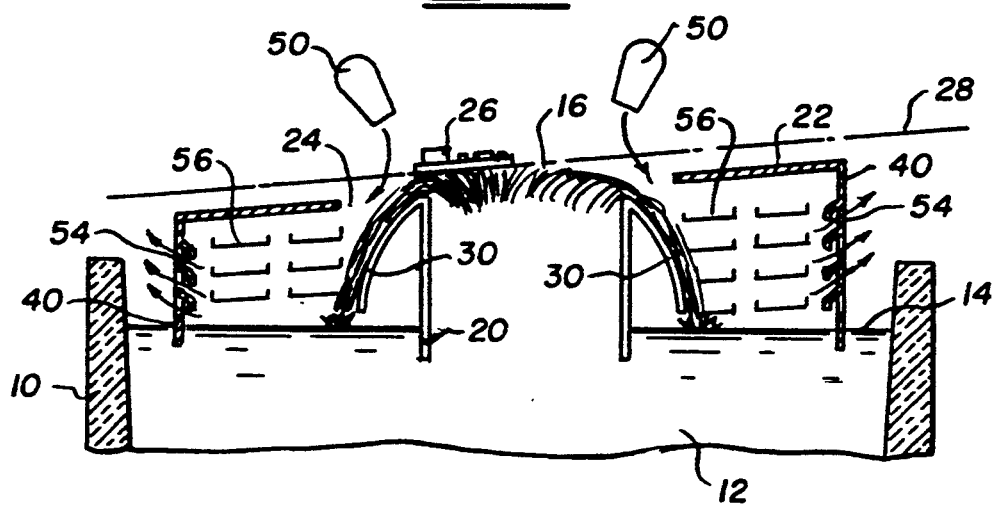
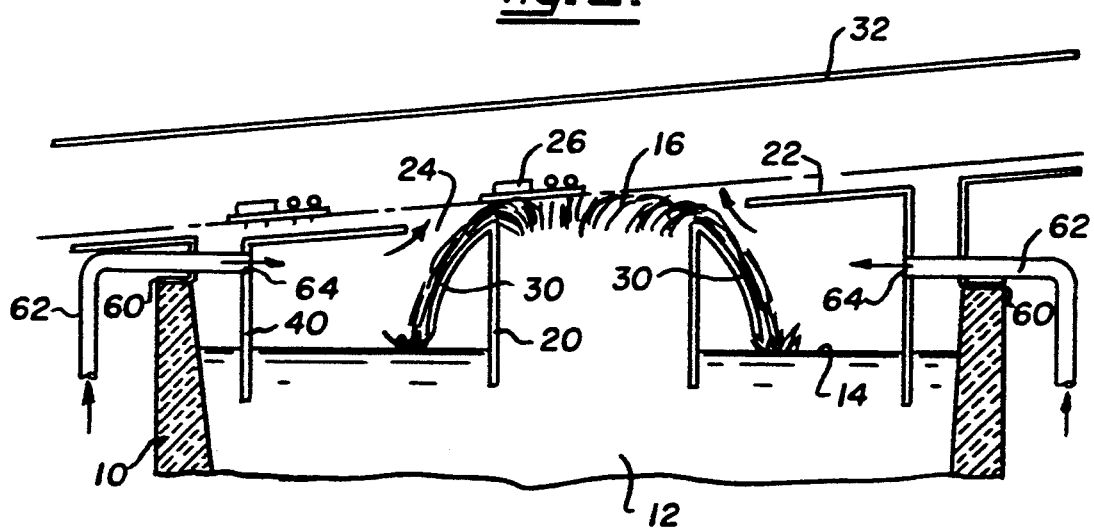

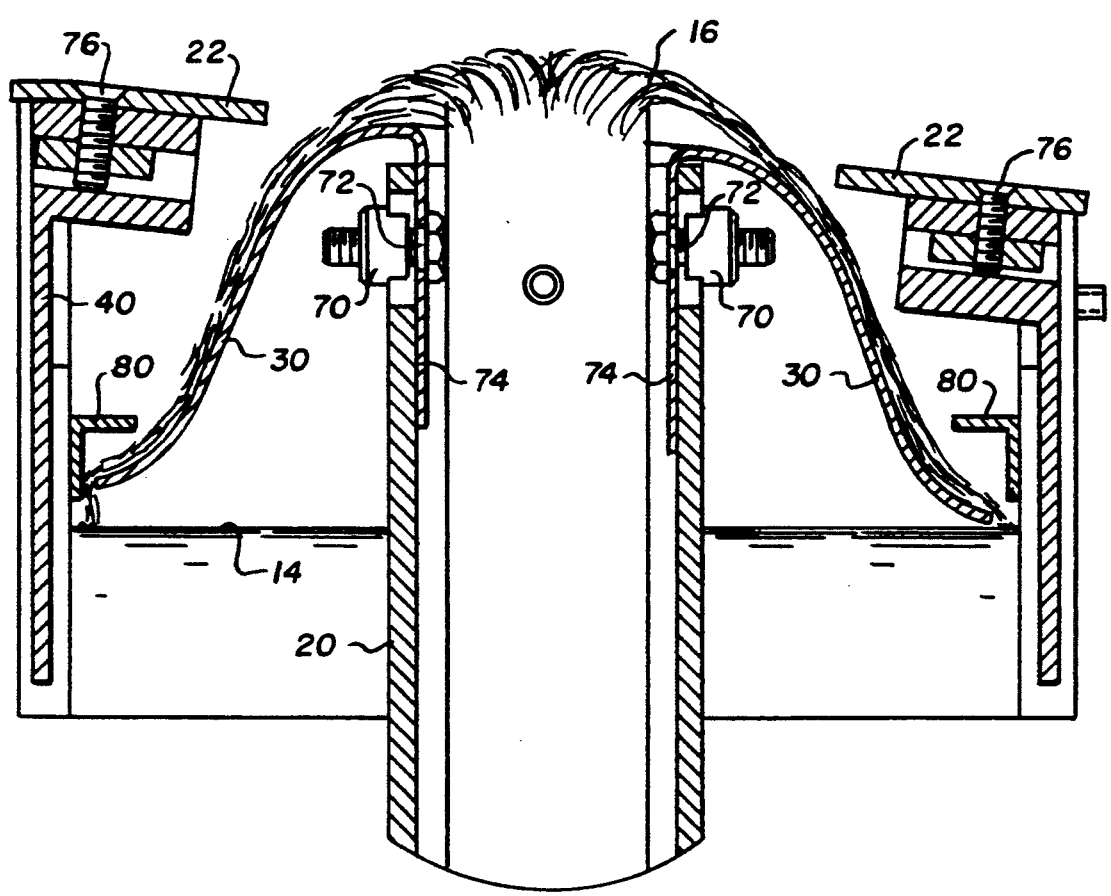

GAS SHROUDED SOLDER WAVE WITH REDUCED SOLDER SPLATTER

CROSS REFERENCE TO RELATED APPLICATIONS

The present application is a continuation-in-part of application Ser. No. 08/013,973 filed Feb. 4, 1993, now U.S. Pat. No. 5,292,055 which in turn is a continuation-in-part of application Ser. No. 07/961,781, filed Oct. 15, 1992, now U.S. Pat. No. 5,240,169, which in turn is a continuation-in-part of application Ser. No. 07/860,316, filed Mar. 30, 1992, now U.S. Pat. No. 5,203,489, which in turn is a continuation-in-part of application Ser. No. 07/804,904, filed on Dec. 6, 1991, now abandoned.

TECHNICAL FIELD

The present invention relates to wave soldering of elements such a printed wiring boards and more specifically to solder coating of wettable metallized surfaces or solder joining at least two wettable metallized surfaces on wiring boards in a solder wave wherein the wave is gas blanketed.

BACKGROUND ART

Printed wiring boards, circuit boards and other elements are preferably soldered today in a gas atmosphere which at least partly reduces the oxygen content. The benefits of soldering in an atmosphere which has a reduced oxygen content are known.

In U.S. Pat. No. 5,203,409 is disclosed gas shrouded wave soldering wherein the solder wave has a cover or shroud with a slot for the solder wave to project therethrough and wherein an inert gas supply, preferably nitrogen, is provided underneath the cover from gas discharge pipes extending on both sides of the solder wave. The disclosure of this patent is incorporated herein by reference.

In U.S. Pat. No. 5,240,169 is disclosed a cover or shroud to at least partially cover a solder reservoir and blanket the solder wave and solder within the reservoir with a shield gas. The disclosure of this patent is incorporated herein by reference.

In our co-pending application Ser. No. 08/013,973 filed Feb. 4, 1993, is disclosed a gas shrouded wave soldering improvement wherein the ends of a solder wave are protected to ensure the solder wave surface is blanketed evenly by a gas with a reduced oxygen content. The disclosure of this application is incorporated herein by reference.

DISCLOSURE OF INVENTION

It is an aim of the present invention to provide a cover or shroud to at least partially cover a solder reservoir and blanket the solder wave as it falls into the reservoir and to contain solder splatter caused by the solder wave falling onto the solder surface in the solder reservoir. Thus solder splatter is substantially prevented from contacting the element to soldered.

In order to assist in preventing solder splatter, gas under pressure is provided to blanket the solder wave either from above the solder wave so that it passes down under the cover through gaps between the edges of the cover slot and the solder wave or, alternatively, the gas passes in to the cover from the sides and then blankets the solder wave and passes out through gaps between the edges of the cover slot and the solder wave.

The present invention provides an apparatus for wave soldering an element comprising: a solder reservoir adapted to contain molten solder and having at least one solder wave nozzle projecting therefrom; pump means for forming a solder wave from the nozzle; cover means for covering at least a portion of the reservoir containing the solder wave, the cover means having at least one longitudinal slot for the solder wave to pass therethrough and to contain solder splatter caused by the solder wave falling into the solder reservoir; supply means for supplying gas to pass downwards through the slot in the cover means on each side of the solder wave and provide a gas blanket over the solder wave, and conveyor means for moving the element in a predetermined path over the cover means ensuring at least a portion of the element passes through the solder wave.

In another embodiment the present invention provides an apparatus for wave soldering an element comprising: a solder reservoir adapted to contain molten solder and having at least one solder wave nozzle projecting therefrom; pump means for forming a solder wave from the nozzle; cover means for covering at least a portion of the reservoir containing the solder wave, the cover means having at least one longitudinal slot for the solder wave to pass therethrough and to contain solder splatter caused by the solder wave falling into the solder reservoir, the cover means having skirts to extend into the solder reservoir on both sides of the solder wave; supply means for supplying gas to pass through openings in the skirts on both sides of the solder wave, the gas permitted to pass upwards through the longitudinal slot on both sides of the solder wave and provide a gas blanket over the solder wave, and conveyor means for moving the element in a predetermined path over the cover means ensuring at least a portion of the element passes through the solder wave.

BRIEF DESCRIPTION OF DRAWINGS

In drawings which illustrate embodiments of the present invention,

FIG. 1 is a diagrammatical side view showing a solder wave with a cover or shroud to prevent splatter contained within an enclosure and having a gas supply to blanket the solder wave, FIG. 2 is a diagrammatical side view similar to FIG. 1 showing apertures in the ends of the cover for the gas to escape from beneath the cover, FIG. 3 is a diagrammatical side view similar to that shown in FIG. 1 but with no enclosure and showing gas knives positioned to direct gas to blanket the solder wave, FIG. 4 is a diagrammatical side view similar to that shown in FIG. 3 showing the cover having skirts extending down below the solder level in the reservoir and with apertures in the skirts for the gas to escape from beneath the cover, FIG. 5 is a diagrammatical side view similar to that shown in FIG. 4 showing apertures in the form of louvres provided in the skirts and also showing louvres in the ends of the cover, FIG. 6 is a diagrammatical side view similar to that shown in FIG. 1 showing gas lines passing through openings in the skirts extending down from the sides of the cover below the solder level, FIG. 9 is a partial side view showing a solder wave nozzle and a cover with curved guides extending downwards from the top of the solder wave nozzle below the solder surface.

MODES FOR CARRYING OUT THE INVENTION

Figure 7:
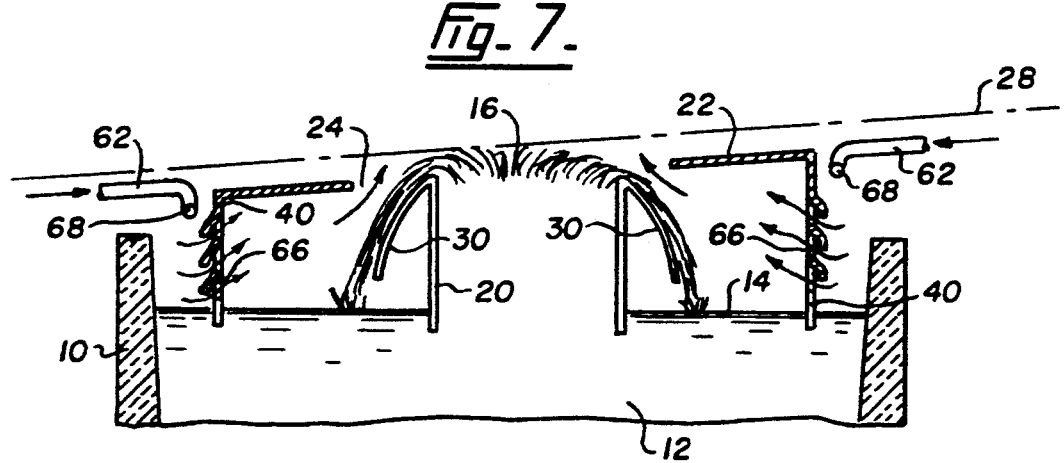
FIG. 7 is a diagrammatical side view similar to that shown in FIG. 6 showing gas discharge pipes positioned adjacent the skirts on both sides of the cover and showing louvres provided in the skirts for gas to pass under the cover and blanket the solder wave.

A solder reservoir 10 shown in FIG. 1 has solder 12 up to a solder level 14. A solder wave 16 is shown wherein the solder is pumped by pump 18 through a solder nozzle 20. A cover or shroud 22 is provided over a portion of the solder reservoir 10 enclosing the solder wave 16 and having a longitudinal slot 24 therein through which the solder wave 16 passes leaving gaps on both sides of the solder wave between the edges of the slot 24 and the solder wave.

An element such as a circuit board 26 is shown passing on a conveyor 28 and, as can be seen, the cover 22 is substantially parallel to the conveyor 28. In the embodiment shown the conveyor is sloped slightly upwards. In another embodiment the conveyor is substantially horizontal and therefore the cover 22 also has a substantially horizontal top.

The solder wave 16 projects a sufficient height above the cover 22 so that the circuit board 26 passes through the solder wave to solder wet the components or join the components on the board 26.

The solder wave shown is a bi-directional non-turbulent wave and the solder nozzle 20 has guides 30 on each side to direct the flow of solder downwards back into the solder reservoir. However, some splashing or splattering of solder occurs. This is contained by the cover 22, thus ensuring that no solder splatter rises up to hit the underside of the element or any other part outside the cover 22.

An enclosure 32 is shown over the solder wave and has enclosure skirts 34 projecting down below the solder level 14, thus ensuring that the enclosure is at least partially sealed restricting the flow of air therein. Flaps 36 are illustrated at the entry and exit to the enclosure 32 again to at least partially restrict the entry of air into the enclosure.

Two gas discharge pipes 38 run substantially parallel to the slot 24 over the gap on each side of the solder wave, and provide a flow of gas. The gas discharge pipes 38 may be directional flow pipes, in other words the gas may be directed down into the gaps or, alternatively, diffuser pipes may be provided and sufficient gas diffused to ensure that the enclosure has a positive pressure therein. The gas from the discharge pipes 38 flows through the gaps formed by the edges of the slot 24 on both sides of the solder wave 26 and therefore substantially blankets the solder wave. The cover 22 has cover skirts 40 at both sides which in this embodiment do not extend down below the solder level 14 and thus gas is permitted to flow back into the enclosure 32 underneath the two cover skirts 40.

In another embodiment illustrated in FIG. 2 the cover skirts 40 extend down below the solder level 14 and end apertures 42 are shown at each end of the shroud or cover 22, thus the gases escape through the apertures 42. There is always a gas flow down through the gaps formed by the slot 24 in the cover 22 on both sides of the solder wave thus ensuring that air is excluded. The end apertures 42 exit into the atmosphere, thus with a positive pressure within the enclosure 32, there is a movement of gas over the solder wave and under the cover 22.

In the embodiment shown in FIG. 3, no enclosure is provided and gas knife jets 50 are illustrated projecting a stream of gas downwards into the gaps formed between the edges of the slots 24 on both sides of the solder wave 16 under the cover 22. Gas blankets the solder wave and then passes out under the edges of the cover skirts 40 on both sides of the cover 22. The cover 22 prevents solder splatter as in the other embodiments. The gas, which preferably has a reduced oxygen content and in one embodiment is primarily nitrogen although other gas additives may be incorporated, is supplied at a sufficient flow rate to ensure that the solder wave 16 is blanketed.

FIG. 4 is another embodiment similar to that shown in FIG. 3 wherein the cover skirts 40 on both sides of the cover 22 extend down below the solder level 14 in the reservoir 10 and apertures 52 are provided in the cover skirts 40 to permit the gas to flow from under the cover 22. In FIG. 5 the cover skirts 40 of the cover 22 have a series of louvres 54 therein to assist in directing the gas from under the cover 22 to escape and ensure there is a flow of gas to blanket the solder wave 16. Furthermore, end louvres 56 are illustrated in the ends of the cover 22 to ensure that there is a steady flow of gas under the cover 22. A positive pressure of gas under the cover 22 prevents air entering.

In FIG. 6 an enclosure 32 is illustrated which encloses the cover 22 and the solder reservoir 10. The enclosure 32 has flanges 60 attached to the side edges of the reservoir 10. In this embodiment gas lines 62 are provided to apertures 64 in the cover skirts 40. The cover skirts 40 extend down below the solder level 14 and gas is provided through the gas lines 62 under the cover 22 to blanket the solder wave 16 and pass upwards through the two gaps formed by the edges of the slot 24 and the solder wave 16. This, in this case, the gas flow is upwards rather than downwards as shown in FIGS. 1 to 5. The gas is provided on both sides of the solder wave to ensure complete blanketing of the solder wave occurs.

FIG. 7 illustrates another embodiment similar to that shown in FIG. 6 but does not have an enclosure. A series of louvres 66 are provided in the cover skirts 40 of the cover 22 and the gas lines 62 have discharge pipes 68 on both sides of the skirt outside the cover 22. Gas is discharged adjacent the skirts 40 and passes under the cover 22 through the louvres 66. The louvres 66 in this case are shown so that gas as it passes up enters the cover 22 whereas FIG. 5 illustrates the louvres 54 the other way around so that gas passing upwards from under the cover 22 exits through the louvres 54.

The discharge pipes 68 may be diffusers or may be pipes have a series of holes therein to ensure there is an even flow of gas for the length of the cover 22. Sufficient gas is provided to ensure that the solder wave 16 is substantially blanketed with gas, preferably gas that has a reduced oxygen content therein.

Figure 8:
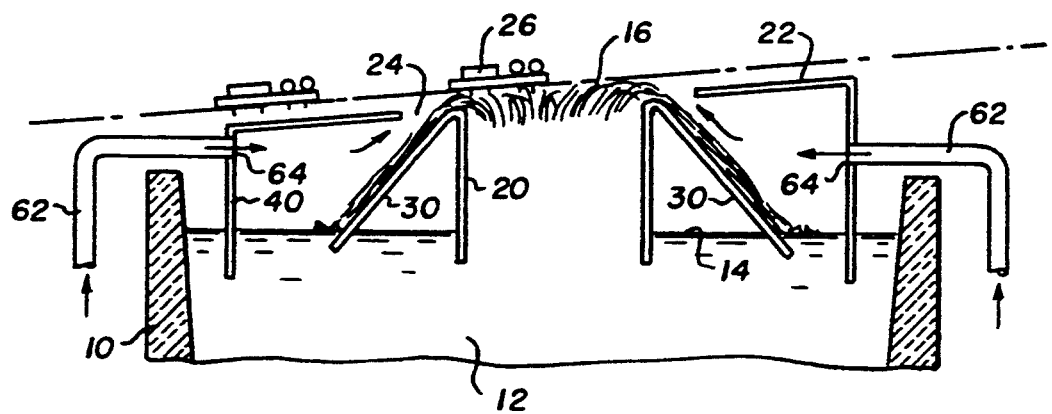
FIG. 8 is a diagrammatical side view similar to that shown in FIG. 6 with sloped guides extending down from the top of the solder wave nozzle below the solder surface.

Another embodiment is shown in FIG. 8 similar to that shown in FIG. 6, wherein a bi-directional non-turbulent wave 16 is shown issuing from a solder wave nozzle 20. Guide members 30 are attached to the top of each side of the nozzle 20 and slope downwards to positions below the solder level 14 in the solder reservoir 12. The end of the guide members 30 are below the cover 22 so that any splashing at the place where solder flowing down the guide members 30 contacts the solder, is contained and does not splatter outside the cover 22. The gas is shown supplied through gas lines 62, however, it may be supplied through louvres as shown in FIG. 7 or by gas diffusers as disclosed in U.S. Pat. Nos. 5,203,409 and 5,240,169. In another embodiment gas may be supplied to flow downwards between the solder wave 16 and the cover 22 as shown in FIGS. 1 to 5.

In FIG. 9, guide members 30 are S-shaped in cross-section to provide a smooth non-turbulent flow of solder from the top of the nozzle 20 into the solder reservoir. The guide members have mounting bolts 70 which pass through slots 72 in mounting flanges 74 of the guide members and thus permit different heights of the guide members 30 to account for a sloping conveyor path.

The covers 22 are shown attached to top portions of the skirts 40 by machine screws 76 which permit lateral movement to vary the gap between the solder wave 16 and the cover 22 to take into account different flows and configurations of the solder wave.

Angle members 80 are shown mounted on the insides of skirts 40, positioned above the bottom of the guide members 30, leaving sufficient space for the solder to flow down into the reservoir. The angle members 80 also assist in further constraining solder splatter within the covers 22.

Various changes may be made to the embodiments disclosed herein without departing from the scope of the present invention which is limited only by the following claims.

The embodiments of the present invention in which an exclusive property or privilege is claimed are defined as follows:

1. An apparatus for wave soldering an element comprising:
   a solder reservoir adapted to contain molten solder and having at least one solder wave nozzle projecting therefrom;
   pump means for forming a solder wave from the nozzle;
   cover means for covering at least a portion of the reservoir containing the solder wave, the cover means having at least one longitudinal slot for the solder wave to pass therethrough and to contain solder splatter caused by the solder wave falling into the solder reservoir;
   supply means for supplying gas to pass downwards through the slot in the cover means on each side of the solder wave and provide a gas blanket over the solder wave, and
   conveyor means for moving the element in a predetermined path over the cover means ensuring at least a portion of the element passes through the solder wave.

2. The apparatus for wave soldering an element according to claim 1 wherein the supply means for supplying gas comprises at least one gas discharge pipe extending adjacent the slot on each side of the solder wave.

3. The apparatus for wave soldering an element according to claim 2 wherein the at least one gas discharge pipe on each side of the solder wave is a diffuser pipe.

4. The apparatus for wave soldering an element according to claim 2 wherein the at least one gas discharge pipe on each side of the solder wave is a knife jet directing gas through the slot on each side of the solder wave.

5. The apparatus for wave soldering an element according to claim 1 wherein the cover means includes side exits for gas to pass out from under the cover means.

6. The apparatus for wave soldering an element according to claim 1 wherein the cover means has skirts extending down on each side of the solder wave into the solder reservoir and has apertures in end walls of the cover means for the gas to pass through.

7. The apparatus for wave soldering an element according to claim 1 wherein the cover means has skirts extending down on each side of the solder wave into the solder reservoir and wherein apertures are provided in the skirts for the gas to pass through.

8. The apparatus for wave soldering an element according to claim 7 wherein the apertures for gas to pass through are louvres.

9. The apparatus for wave soldering an element according to claim 1 including an enclosure over the reservoir containing the solder wave and the cover means.

10. The apparatus for wave soldering an element according to claim 1 wherein the solder wave is a bi-directional non-turbulent solder wave.

11. An apparatus for wave soldering an element comprising:
    a solder reservoir adapted to contain molten solder and having at least one solder wave nozzle projecting therefrom;
    pump means for forming a solder wave from the nozzle;
    cover means for covering at least a portion of the reservoir containing the solder wave, the cover means having at least one longitudinal slot for the solder wave to pass therethrough and to contain solder splatter caused by the solder wave falling into the solder reservoir, the cover means having skirts to extend into the solder reservoir on both sides of the solder wave;
    supply means for supplying gas to pass through openings in the skirts on both sides of the solder wave, the gas permitted to pass upwards through the longitudinal slot on both sides of the solder wave and provide a gas blanket over the solder wave, and
    conveyor means for moving the element in a predetermined path over the cover means ensuring at least a portion of the element passes through the solder wave.

12. The apparatus for wave soldering an element according to claim 11 wherein the openings in the skirts on both sides of the solder wave are connected to gas supply lines.

13. The apparatus for wave soldering an element according to claim 11 wherein the openings in the skirts on both sides of the solder wave are louvres and wherein gas is supplied outside the skirts to enter the louvres in the skirts.

14. The apparatus for wave soldering an element according to claim 13 including diffuser pipes extending along the skirts to provide pressurized gas to enter the louvres in the skirts.

15. The apparatus for wave soldering an element according to claim 11 including an enclosure over the reservoir containing the solder wave and the cover means.

16. The apparatus for wave soldering an element according to claim 11 wherein the solder wave is a bi-directional non-turbulent solder wave.

17. An apparatus for wave soldering an element comprising:
- a solder reservoir adapted to contain molten solder at a solder level and having at least one solder wave nozzle projecting therefrom;
- pump means for forming a solder wave from the nozzle;
- cover means for covering at least a portion of the reservoir containing the solder wave, the cover means extending adjacent at least one side of the solder wave to contain solder splatter from the solder wave falling into the solder reservoir;
- supply means for supplying gas on both sides of the solder wave nozzle above the solder level, the gas to pass upwards between the cover means and the solder wave and provide a gas blanket over the solder wave, and
- conveyor means for moving an element in a predetermined path over the cover means ensuring at least a portion of the element passes through the solder wave.

18. The apparatus for wave soldering an element according to claim 17 wherein the cover means extends adjacent both sides of the solder wave, and whereas the supply means supplies gas to pass upwards on both sides of the solder wave between the cover means and the solder wave.

19. The apparatus for wave soldering an element according to claim 17 including a guide member sloping downwards from the top of the solder wave nozzle to a position in the solder reservoir below the solder level and underneath the cover means, so that the solder wave falls into the solder reservoir below the cover means.

20. The apparatus for wave soldering an element according to claim 18 wherein the solder wave is a bi-directional non-turbulent solder wave having guide members on both sides of the solder wave nozzle sloping downwards from the top of the solder wave nozzle to positions in the solder reservoir below the solder level and underneath the cover means, so that the solder wave falls into the solder reservoir below the cover means.

21. The apparatus for wave soldering an element according to claim 20 wherein the guide members each have an S-shaped configuration to provide smooth non-turbulent flow for the solder wave falling into the solder reservoir.

22. The apparatus for wave soldering an element according to claim 20 wherein each of the guide members is adjustable for height from the top of the solder wave nozzle.

23. The apparatus for wave soldering an element according to claim 20 wherein the cover means has skirts to extend into the solder reservoir on both sides of the solder wave, and wherein angle members are positioned beneath the cover means, extending from the skirts over bottom ends of the guide members to further constrain solder splatter.

* * * * *